(12) United States Patent
Ginsberg

(10) Patent No.: US 7,252,049 B2
(45) Date of Patent: Aug. 7, 2007

(54) ANIMAL FOOD DISTRIBUTOR

(76) Inventor: Navarre Stephen Ginsberg, 29585 Fox Hollow Rd., Eugene, OR (US) 97405

( * ) Notice: Subject to any disclaimer, the term of this patent is extended or adjusted under 35 U.S.C. 154(b) by 327 days.

(21) Appl. No.: 10/710,996

(22) Filed: Aug. 16, 2004

(65) Prior Publication Data
US 2006/0032450 A1 Feb. 16, 2006

(51) Int. Cl.
A01K 5/00 (2006.01)
(52) U.S. Cl. .................. 119/57.91; 222/614; 111/11
(58) Field of Classification Search ............ 119/57.91; 222/613, 614, 619, 623, 624; 239/685; 111/11, 111/12, 130
See application file for complete search history.

(56) References Cited

U.S. PATENT DOCUMENTS

| RE10,166 E | * | 7/1882 | Stroud | |
|---|---|---|---|---|
| 2,379,724 A | * | 7/1945 | Lanham | ......................... 111/51 |
| 2,742,196 A | * | 4/1956 | Grether | ...................... 222/227 |
| 4,867,381 A | * | 9/1989 | Speicher | ..................... 239/665 |

* cited by examiner

Primary Examiner—Rob Swiatek

(57) ABSTRACT

An animal feeder having a distribution mechanism which allows food to be either dropped or scattered in random directions, providing exercise and entertainment for the animal. The feeder includes a food hopper supported by wheels, which when pushed or pulled by the user activate a distribution mechanism which releases food from the hopper at predictable intervals.

7 Claims, 4 Drawing Sheets

ANIMAL FOOD DISTRIBUTOR

BACKGROUND ART

1. Field of the Invention

This invention pertains in general to feeding animals, and more particularly to feeding household pets in a manner intended to entertain both pet and owner.

2. Description of the Related Art

The number of domestic dogs and cats in United States households is estimated at more than 100 million. As Americans find themselves with a dwindling amount of free time to interact with their pets, they are drawn to increasingly creative methods of preventing the boredom which often leads to behavioral problems.

One method of keeping captive animals stimulated, which animal behaviorists highly recommend, is to hide or scatter food around the animal's living space. This encourages the animal to use its sight and smell to seek out its dinner, rather than allowing it to passively wait by the food bowl.

Current methods for scattering pet food are inadequate for a variety of reasons. For example, if a dog owner intends to feed his pet an entire meal by scattering kibble around the backyard, he would likely take a handful of food, walk around the yard sprinkling it over the grass, and return multiple times to retrieve another handful. There is no practical way to measure the amount of food which is being delivered, and this method requires multiple trips.

This presents a need for a device which allows the user to easily measure the amount of food to be distributed, to scatter the food evenly, and to transport the food throughout the distribution process without requiring multiple refills.

BEST MODE

The above need is met by an animal feeder characterized by a distribution mechanism which allows food to be either dropped or scattered in random directions, providing exercise and entertainment for the animal. The feeder includes a food hopper supported by wheels, which when pushed or pulled by the user activate a distribution mechanism which releases food from the hopper at predictable intervals.

DISCLOSURE

Figure 1:
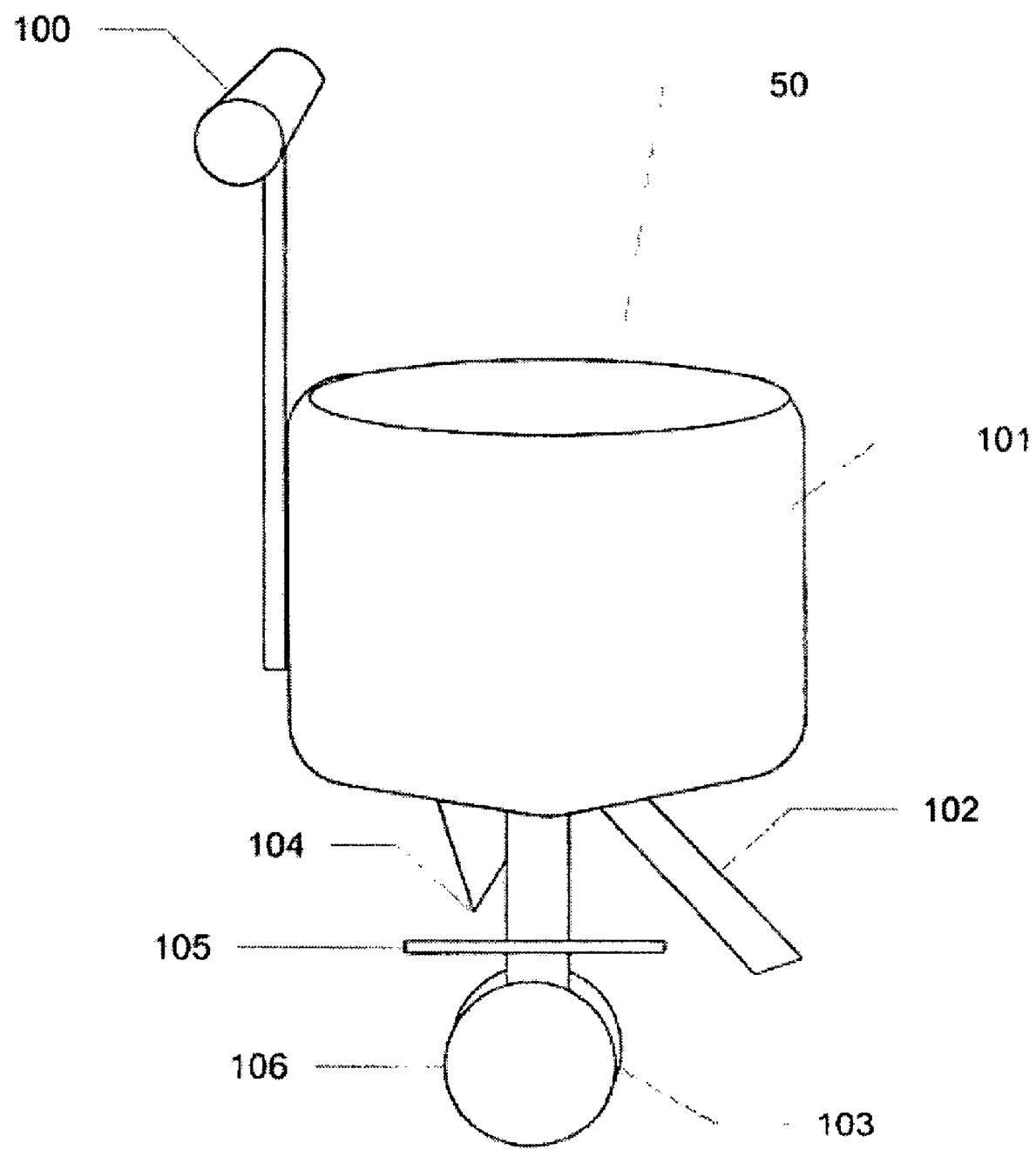
FIG. 1 is a side view of one embodiment of the present invention.

FIG. 1 is a side view of an animal food distributor 50. It includes a hopper 101 into which the food is poured, a handle 100, an optional parking peg 102, a pair of wheels 103, and an optional distribution wheel 105.

In the embodiment of the animal food distributor depicted in FIG. 1, the user places food into the top of the hopper 101, and propels the invention using the handle 100. As the wheels 103 turn, gears on the axle (visible in FIG. 2) rotate the center peg 106. This rotation of the center peg 106 actuates the internal mechanism (described in detail below) which releases food nuggets through the funnel 104. If the optional distribution wheel 105 is attached, the nuggets fall onto the wheel and are scattered in different directions. If the distribution wheel is not attached, the food falls to the ground in a relatively straight line, trailing the invention.

As shown in FIG. 1, the illustrated embodiment of the invention includes a handle 100 affixed to the side of the hopper 101. A user uses the handle 100 to propel the invention and therefore cause the wheels to rotate and the food to dispense. In the illustrated embodiment, the handle has a "T" shape, although in other embodiments of the present invention the handle can have a different shape such as a shaft, a steering wheel, or a molded grip.

The hopper 101 depicted in FIG. 1 is shaped to hold the animal food to be dispensed, and may also have marks for measuring the correct amount of food. In the illustrated embodiment, the hopper is a bucket shape with an opening at the top through which the food is inserted. In other embodiments, the hopper may have a different shape, such as a tube, and may have the opening placed elsewhere, such as to the back or side. Other embodiments may also include a lid.

As seen in the embodiment of the invention shown in FIG. 1, the invention rests on two wheels 103 connected by a horizontal axle 106. The turning of the wheels actuates the mechanism which dispenses and distributes the food. The pictured embodiment uses two wheels, although in other embodiments the invention may have more than two wheels, and the wheels may be larger or smaller than those depicted in FIG. 1.

The embodiment of the invention pictured in FIG. 1 uses a parking peg 102, which holds the invention upright when it is in a parked position. In the pictured embodiment, the peg is a fixed, stick-like projection attached to the hopper. In other embodiments, the peg may be attached elsewhere, such as to the handle 100, or may be absent altogether. The peg may also have additional functions in other embodiments, such as the ability to fold up or retract when not in use.

The embodiment of the invention illustrated in FIG. 1 includes a funnel 104, where the food is released, and an optional distribution wheel 105, which scatters the food pellets. These are described further below.

Figure 2:
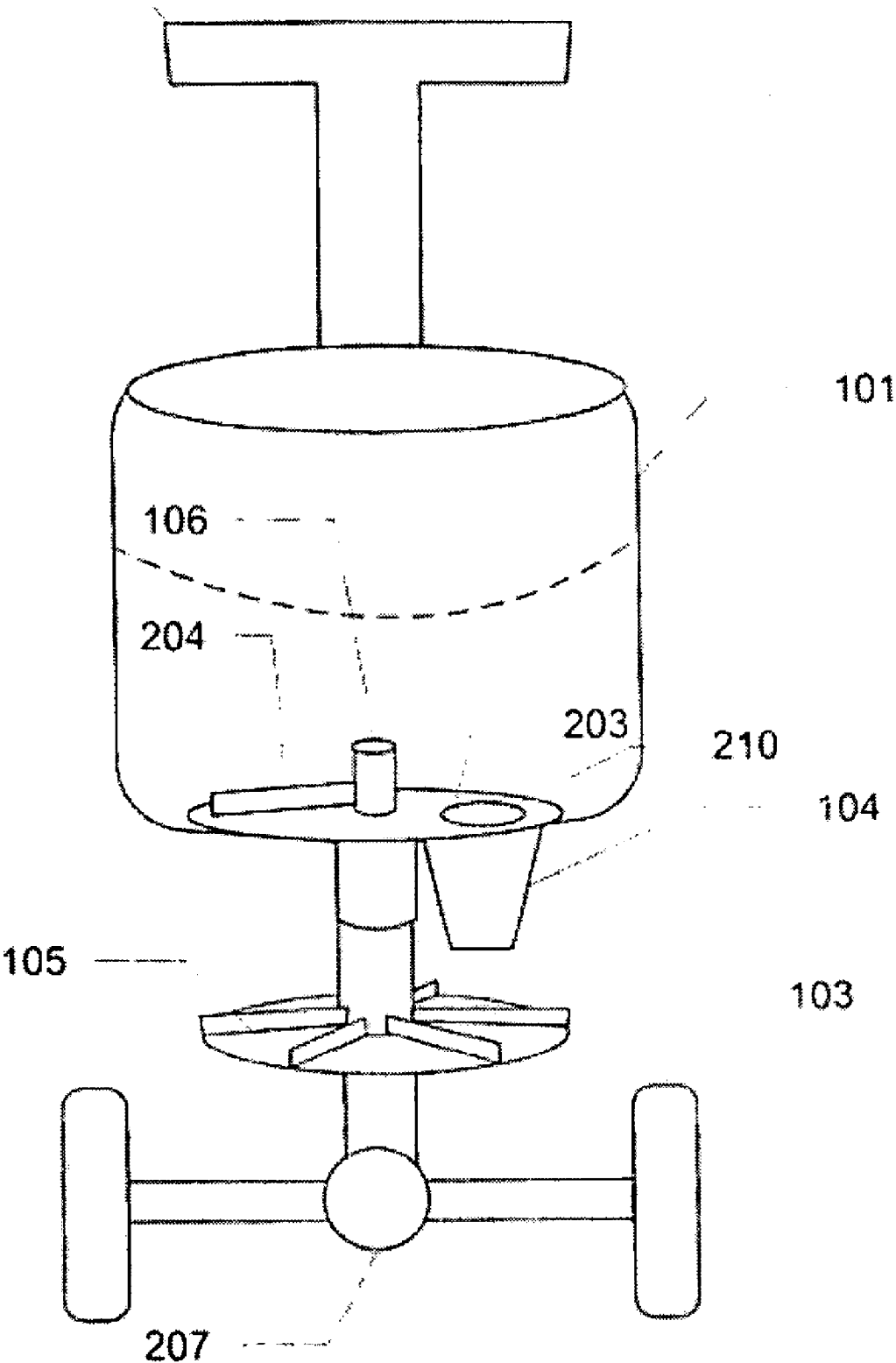
FIG. 2 is a front view of one embodiment of the present invention, seen as if the hopper were transparent.

FIG. 2 demonstrates the inner workings of one embodiment of the invention. In this illustration, the hopper 101 is shown as if it were transparent. In general, food placed into the hopper 101 rests on top of the distribution controller 203. As the invention is pushed or pulled, the turning wheels 103 actuate gears 207, which rotate the center peg 106. The center peg 106 imparts its rotation to the stirrer 204, the food controller 203, and the distribution wheel 105. As the distribution controller 203 rotates, a hole 210 in the controller periodically lines up with a hole 210 in the bottom of the hopper 101, allowing a piece of food to fall through. The stirrer 204 keeps the pieces of food moving in the bottom of the hopper 101, ensuring that the pieces of food fall through when appropriate. In this embodiment of the invention, when a piece of food is released, it comes out of the optional funnel 104, and falls onto the distribution wheel 105, which randomly scatters the food as it rotates.

As depicted in FIG. 2, the distribution controller 203 is located at the bottom of the hopper. It is attached to the center peg 106, and thus rotates as the center peg rotates. In the illustrated embodiment of the invention, the distribution controller 203 has one large hole 210, which, as it rotates, periodically lines up with the hole in the bottom of the hopper 101 located above the funnel 104. In alternate embodiments of the invention, the disc 203 may have multiple holes, for more frequent food releases, or smaller holes to accommodate differing food pellet sizes. Alternatively, the disc may be removable and able to be replaced by discs of different configurations.

As seen in the embodiment of the invention illustrated in FIG. 2, the stirrer 204 is located above the controller disc 203 and is attached to the center peg 106. Thus, when the center peg 106 rotates, the stirrer 204 sweeps across the bottom of the hopper 201. This ensures that when the supply of food runs low, the remaining pellets are swept out of the hole. Although the pictured embodiment of the invention has only one stirrer, other embodiments may have multiple stirrers. Alternative embodiments may also have stirrers of a different shape or size than the example in the illustrated embodiment.

The illustrated embodiment in FIG. 2 includes a funnel 104 which may or may not be present in alternate embodiments. The funnel serves to help direct falling food pellets onto the distribution wheel 105 as they are released from the hopper 101.

The embodiment pictured in FIG. 2 includes a distribution wheel 105 which may or may not be present in alternate embodiments. When it is used, it is attached to the center peg 106, and thus rotates along with it. The food pieces drop out of the hopper 101 and fall onto the wheel 105. In the illustrated embodiment, the wheel has raised dividers which push the food forward so that it is released in different directions as it rotates. Alternate embodiments may omit these dividers, or may include them in different sizes, amounts, or configurations than illustrated in FIG. 2.

The embodiment of the invention shown in FIG. 2 includes gears 207 located between the wheels, and attached to the center peg 106. These gears transfer the rotation of the wheel axle, when the invention is in motion, into a rotation of the center peg 106. In the illustrated embodiment, the gears are covered by a spherical protective casing, but other embodiments may use a casing of a different shape, or may not use a casing at all.

Figure 3:
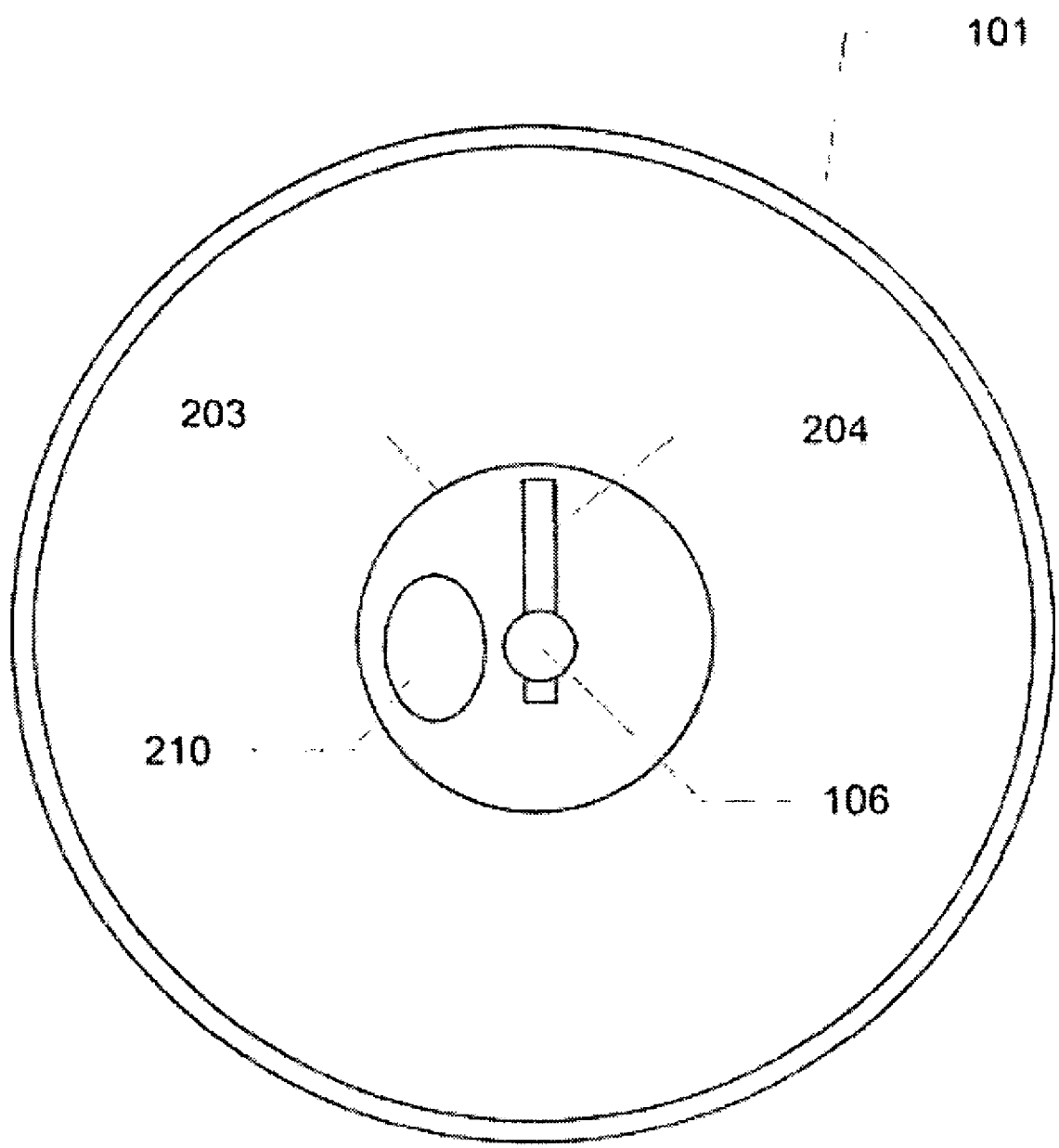
FIG. 3 is a top view of one embodiment of the present invention, looking down inside the hopper, to illustrate the internal mechanism.

FIG. 3 depicts a view of one embodiment of the invention, as seen looking down into the top of the hopper 101. The center peg 106 is attached to the stirrer 204, and the controller disc 203. As previously described, the controller disc 203 and stirrer 204 rotate along with the center peg 106, causing the hole 210 in the controller disc 203 to periodically line up with a hole at the bottom of the hopper 101, at which point a piece of food is released.

Figure 4:
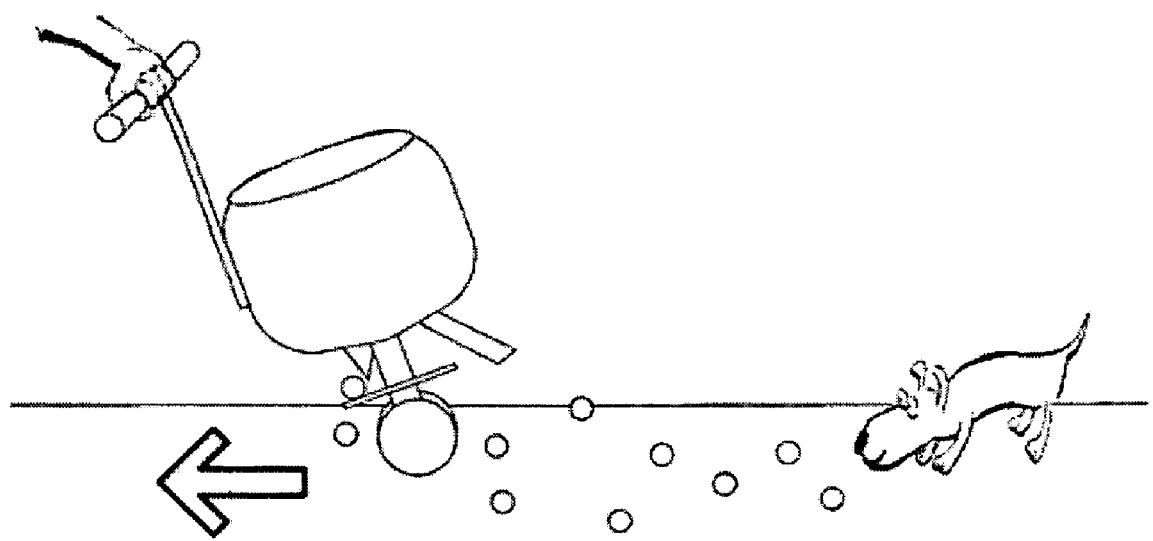
FIG. 4 depicts an embodiment of the present invention being used to scatter dog food.

FIG. 4 depicts an example of how an embodiment of the invention might be used to feed a dog. In this embodiment, the user pulls the animal food distributor forward, actuating the distribution mechanism and causing kibble to be scattered in random directions. The dog is entertained by seeking out each piece of kibble to eat.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. An animal feeder, comprising: a hopper for storing animal feed and having at least one opening for releasing the animal feed, a horizontally oriented rotatable distribution wheel rotatable about its vertical axis, disposed to encounter and scatter the animal feed, rotatably connected to the hopper and having an opening so that feed is released when the opening in the distribution controller rotates into alignment with the at least one opening in the hopper, a stirrer supported by the distribution controller and rotatably mounted within the hopper and coupled to a rotation transfer means to encounter the animal feed stored therein and guide the feed into the at least one opening in the hopper, a horizontally oriented distribution wheel rotatable about its vertical transverse axis, disposed to encounter and scatter the animal feed, a wheel supporting the animal feeder and adapted to rotate when the feeder is moved, and the rotation transfer means for imparting the rotation of the wheel to the distribution controller and causing animal feed to be released as the feeder is moved, the distribution controller being configured to distribute the animal feed in a manner such that an animal proximate to the feeder is entertained and exercised in fetching the animal feed.

2. A feeder according to claim 1, wherein the at least one opening of the hopper is at the bottom of the hopper.

3. A feeder according to claim 1, further comprising: a handle for controlling movement of the animal feeder.

4. A feeder according to claim 1, further comprising: a second wheel connected to the wheel with an axle.

5. A feeder according to claim 4, wherein the rotation transfer means comprises: a set of gears connected to the axle and imparting the axle's rotation to a center peg.

6. A feeder according to claim 1 further comprising: a guidance member, disposed between the distribution controller and the distribution wheel for guiding released food to the distribution wheel.

7. A feeder according to claim 1, further comprising: a parking peg movably attached to the animal feeder and adapted to hold the feeder upright if the parking peg is in a parked position.

* * * * *